United States Patent [19]
Derouette et al.

[11] 4,192,371
[45] Mar. 11, 1980

[54] PROCESS FOR SUPPLYING THERMAL ENERGY FOR AN ENDOTHERMIC REACTION FROM A SOURCE NOT AVAILABLE AT THE REACTION SITE

[75] Inventors: Jean-Jacques Derouette, Onex; Jacques Dartoy, Grand-Lancy, both of Switzerland; Jacques Fournier, Sciez, France; Bernard Vollerin, Geneva, Switzerland

[73] Assignees: Battelle Memorial Institute, Carouge, Switzerland; Agence Nationale de Valorisation de la Recherche (ANVAR), Neuilly-sur-Seine, France

[21] Appl. No.: 824,308

[22] Filed: Aug. 12, 1977

[30] Foreign Application Priority Data

Aug. 13, 1976 [CH] Switzerland .................. 10312/76

[51] Int. Cl.² ............................................. F28D 15/00
[52] U.S. Cl. ................................. 165/1; 48/197 R; 48/202; 48/209; 62/2; 62/4; 126/263; 165/DIG. 17; 165/106
[58] Field of Search .................. 62/2, 4; 126/263; 165/1, 107, DIG. 17; 48/197 R, 202, 209

[56] References Cited

U.S. PATENT DOCUMENTS

| | | | |
|---|---|---|---|
| 3,075,361 | 1/1963 | Lindberg, Jr. | 62/4 |
| 3,958,625 | 5/1976 | Wentorf, Jr. | 165/DIG. 17 |
| 3,967,676 | 7/1976 | Spacil | 165/DIG. 17 |
| 3,972,183 | 8/1976 | Chubb | 60/641 |
| 4,044,819 | 8/1977 | Cottingham | 165/DIG. 17 |

*Primary Examiner*—Leland A. Sebastian
*Attorney, Agent, or Firm*—Karl F. Ross

[57] ABSTRACT

Thermal energy, especially solar heat, is converted into chemical energy by being used for the endothermic dissociation of a compound which is exothermically recombinable to release at least a substantial part of that energy at a time and/or location at which the original heat source is not readily available. One or more of the dissociation products are transported to the point of utilization, preferably after interim storage, and are there recombined with one another and/or with locally available reactants to restore the original compound which is then returned, again preferably after interim storage, to the dissociation site for a repetition of the process. The exothermic reaction at the recombination site may be used to decompose a locally available compound, e.g. water, for the purpose of liberating one of its constituents, e.g. hydrogen.

20 Claims, 9 Drawing Figures

PROCESS FOR SUPPLYING THERMAL ENERGY FOR AN ENDOTHERMIC REACTION FROM A SOURCE NOT AVAILABLE AT THE REACTION SITE

FIELD OF THE INVENTION

Our present invention relates to a process for providing heat from a convenient source at a point of utilization at which that source is not readily available.

BACKGROUND OF THE INVENTION

In the continued quest for new sources of energy, solar heat plays an important part. The sun as a source of energy, however, is not universally available so that direct utilization of its radiation is limited as to both time and location. Thus, there is a need for storage and transportation whenever it is desired to utilize solar energy at a time and/or in a place where there is no sunlight.

Thermal energy may be stored either directly or indirectly. Direct storage utilizes the thermal capacity of various bodies, such as water, walls, rocks or soil, for example. Indirect storage, involving a conversion of sensible heat into latent heat or other forms of energy, makes use of such physical or chemical phenomena as melting, vaporization, solid/solid transformation or dissolution. Direct-storage systems generally require large volumes of heat-storing materials, with attendant high costs and problems of space; in the absence of effective thermal insulation, which in many instances can be achieved only with difficulty or not at all, the occurrence of significant heat losses restricts this technique to short-term storage. Among the various indirect-storage systems, those based on conversion into chemical energy appear to be the most promising since they obviate the aforestated drawbacks and operate nearly without losses over prolonged periods.

OBJECT OF THE INVENTION

The object of our present invention, therefore, is to provide an efficient process for the chemical storage of thermal energy from an intermittent or localized source, such as the sun, for utilization at a point where such energy would otherwise be unavailable.

SUMMARY OF THE INVENTION

We realize this object, in conformity with our present invention, by (a) endothermically dissociating a starting compound, capable of exothermic recombination, with the aid of thermal energy from a limitedly available source as discussed above, (b) transferring one or more components of the starting compound, resulting from that dissociation, to a recombination site close to or coinciding with the point of utilization, (c) exothermically reacting the component or components so transferred, at the recombination site, with one another and/or with some other complementary component or components to reconstitute the starting compound with release of a substantial part of the thermal energy originally invested, and (d) retransferring the reconstituted compound to the dissociation site preparatorily to a repetition of the entire cycle (a)–(d).

The thermal energy released at the recombination site can be used for a variety of purposes, including space heating. A particularly advantageous use is for the promotion of an endothermic reaction which may or may not involve the component or components of the starting compound transferred to the recombination site. Thus, for example, the transferred component may be a metal or a lower oxide reacting exothermically with atmospheric oxygen or with some other locally available oxidant such as water; in the latter instance, the reaction liberates hydrogen which can then be used for industrial purposes. Other locally available compounds, especially organic substances, can be decomposed by the released thermal energy to produce, for instance, a synthesis gas.

Energy sources other than the sun, which may be classified as limitedly available within the context of our invention, include geothermal springs whose heat output can thus be utilized at remote locations; similar considerations apply to industrial generators of waste heat, such as nuclear reactors, which exist only in a few widely separated places. They further include municipal utilities and the like supplying power at lower rates at certain times (usually at night) so that storage of their energy for use at other times is economically desirable.

In many cases it will also be advantageous to storage a quantity of the recycled substances, i.e. the component or components to be transferred to the recombination site in step (b) and the reconstituted starting compound to be retransferred to the dissociation site in step (d), to bridge any intervals during which the primary source of energy is absent, inoperative or more expensive. The length of storage may range from a few minutes, as in the case of atmospheric disturbances or a solar eclipse, to a period of many months, e.g. in situations where sufficient sunlight is only seasonally available.

The endothermically dissociable substances capable of being utilized in a process according to our invention may be generally designated AX, where A represents a component or group of components to be recycled and X is another component or group of components which is available at the recombination site without recycling. Thus, the dissociation process can be represented by $$AX \xrightarrow{-Q} A+X \qquad (101)$$

where $-Q$ represents the thermal energy required to carry out the dissociation. At the recombination site, the nonrecycled component or group of components X may be available in the form $X_m Y_n$, i.e. as a constituent of a different compound. Thus, the recombination process restoring the original compound AX is of the form $$A+X_m Y_n \xrightarrow{+Q} AX+X_{m-1}Y_n \qquad (102)$$

where Q represents the thermal energy released by the exothermic reaction. With $n=0$, component X (e.g. oxygen, water or carbon dioxide) is directly available; in a limiting case, $m=1$ so that reaction (102) yields only the starting compound AX.

Advantageously, components A and X are in different states of aggregation upon dissociation from each other, e.g. solid or liquid in the case of A and gaseous in the case of X, to simplify their separation. Naturally, the choice of substances to be used as starting compounds must also take into account a number of other factors, such as density of the material, stability of the reaction products, operating temperatures, reactivity of the component, corrosion, toxicity and cost; although theoretically there could be an infinite number of recyclings, some losses will occur in practice so that either the starting compound or its recycled component or components will have to be replenished from time to time.

The aforedescribed general reactions (101) and (102) can be divided into three families. The first family encompasses systems using atmospheric oxygen as a reactant. These reactions will then have the form

 (201)

at the dissociation site and

 (202)

at the recombination site, R being a metal or metalloid and p being an integer greater than zero. The dissociation process corresponds in this instance to a reduction of the starting compound from a higher oxide to a lower one, or possibly to its elemental state. Examples of such substances $RO_p/RO_{p-1}$ are the following:

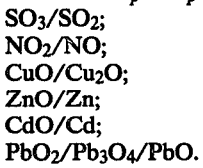

Some of these reactions, such as the reduction of CuO to $Cu_2O$ or $PbO_2$ to PbO, are promoted by luminous radiation, i.e. by solar photons accompanying the thermal energy derived from the sun.

The second family uses hydrates or hydroxides as starting compounds. This family may be subdivided into two classes, one of them involving no separation of hydrogen and oxygen whereas the other utilizes water as a reactant. Thus, the reactions relating to systems of the first class of this family can be represented by

 (301)

at the dissociation site and

 (302)

at the recombination site where A is a hydratable substance and n represents the number of water molecules contained in the hydrate employed.

For the second class, the reactions are

 (401)

at the recombination site and

 (402)

 (402')

at the recombination site where R is a metal (e.g. zinc or cadmium) or a lower oxide thereof; reaction (402') may or may not take place within the system.

In the third family the starting compound is of the form $MXO_2$ where M is a metal (e.g. calcium, magnesium or manganese) and X is a multivalent nonmetal, preferably carbon or sulfur. If the starting compound is a carbonate, the reactions are

 (501)

at the dissociation site and

 (502)

at the recombination site. In the case of a sulfate, they are

 (601)

at the dissociation site and

 (602)

at the recombination site.

Lithium carbonate and barium or zinc sulfate could also be used.

In such a system it will usually be necessary to store and recycle the two dissociation products MO and $XO_{n-1}$, unless the latter is locally available ($O_2$, for example), besides the reconstituted starting compound $MXO_n$.

Although, for the sake of simplicity, we shall refer hereinafter only to solar energy, it will be understood that other heat sources or combinations thereof could also be used.

BRIEF DESCRIPTION OF THE DRAWING

The above and other features of our invention will now be described in detail with reference to the accompanying drawing in which.

SPECIFIC DESCRIPTION

Figure 1:
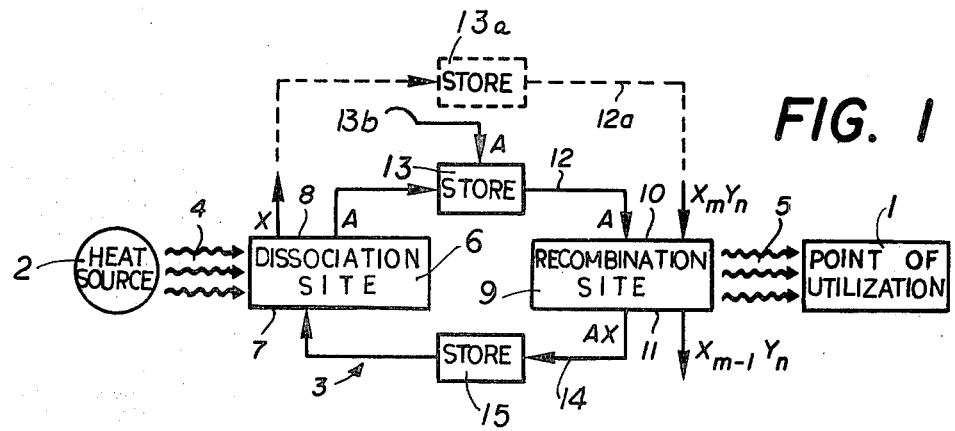
FIG. 1 is a block diagram illustrating the process according to our invention.

In FIG. 1 we have shown at 1 a point or area of utilization of thermal energy at which a heat source 2, such as the sun, is not readily available. A recycling system 3 includes a dissociation site in the form of a reactor 6, receiving solar energy 4, and a recombination site in the form of a reactor 9, delivering heat 5 to the area 1. Reactor 6 has an entrance 7 for a compound AX and an exit 8 where its components A and X are separately discharged. Component A is delivered to an entrance 10 of reactor 9 via a conduit 12 including a reservoir 13 for the interim storage of that component. Also fed to entrance 10 is a compound $X_mY_n$ reacting exothermally with component A, complementing the latter to a replica of the starting compound AX while leaving the site 9 at an exit 11 in the form $X_{m-1}Y_n$. In the limiting case discussed above, with m=1 and n=0, the component X can also be recycled from reactor 6 via a conduit 12a after interim storage in a reservoir 13a; in that case, of course, the product $X_{m-1}Y_n$ is nonexistent. The reconstituted compound AX is fed back to entrance 7 of reactor 6 via a conduit 14 containing a reservoir 15 for interim storage.

As will be readily apparent from the foregoing discussion, solar heat 4 is converted in reactor 6 into chemical energy and is then reconverted into free thermal energy 5 in reactor 9. The carrier component A and the reconstituted starting compound AX can be recycled indefinitely, with infeed of additional material A via an inlet 13b of reservoir 13 to compensate for unavoidable losses. The storage capacity of the several reservoirs should be sufficient to account for expected fluctuations in supply and demand.

If reservoirs 13 and 15 are thermally insulated, surplus energy available in either reactor 6, 9 may be preserved at least for short periods in the form of sensible heat supplementing the chemically stored energy.

Figures 2, 3:
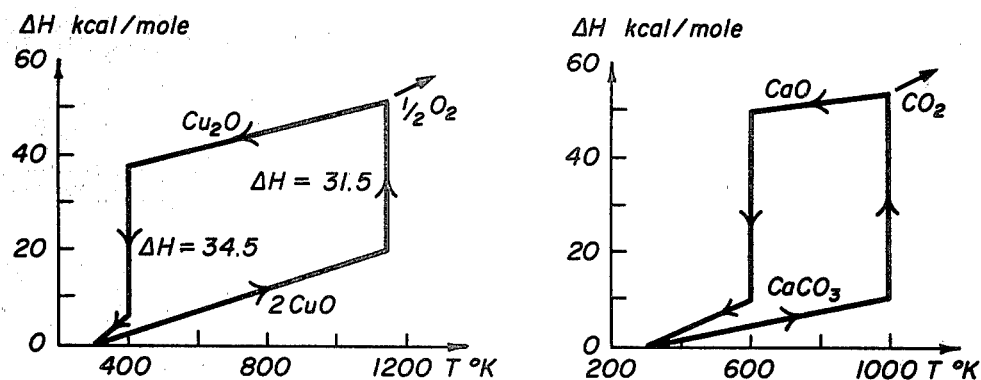
FIGS. 2 and 3 are graphs showing the dissociation and recombination of a representative oxide and a representative carbonate, respectively, in a system according to our invention.

In FIG. 2 we have plotted enthalpy $\Delta H$ (in kcal/mole) against temperature T (in degrees K) for the process given by reactions (201) and (202), with CuO as the starting material. On the rising branch of the curve, representing the dissociation step, the enthalpy increases slowly up to a temperature of about 1150° K. and then jumps suddenly from about 20 to 50 kcal/mole with the release of $O_2$ and reduction of the starting compound to $Cu_2O$. The latter compound is allowed to cool to about 400° K. and then exothermally reacts with oxygen supplied at the recombination site to release the chemically stored heat while being reconverted to CuO. The change in heat content, $\Delta H$, amounts to $+31.5$ kcal/mole on dissociation and to $-34.5$ kcal/mole on recombination.

FIG. 3 represents a similar graph for reactions (501) and (502), with $CaCO_3$ used as the starting compound. In this instance, dissociation occurs at about 1000° K., with $\Delta H \approx +43$ kcal/mole, whereas recombination takes place at 600° K., with $\Delta H \approx -38$ kcal/mole.

The graphs of FIGS. 2 and 3 are, of course, idealized since they assume isothermal reactions and also disregard the heat lost with the volatile component ($O_2$ or $CO_2$) which usually leaves the dissociation site at a temperature higher than that at which its replacement enters the recombination site.

Figure 4:
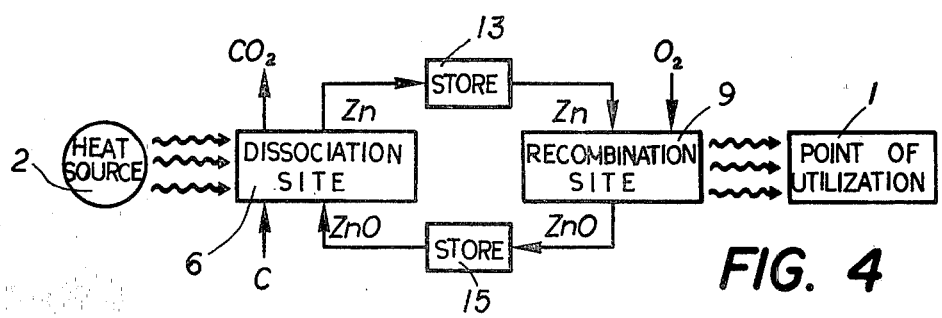
FIGS. 4 and 5 are diagrams similar to FIG. 1, illustrating certain modifications.

In some instances a purely pyrolytic dissociation—such as the reduction of a metal oxide—requires temperatures too high to be practical. In such cases we can promote the reaction with the aid of a suitable additive, such as carbon, allowing the operation to proceed at a lower temperature level. Thermal reduction of ZnO to Zn, for example, calls for temperatures above the sublimation point of 1800° C., yet with the help of a carbonaceous substance such as pyrolytic charcoal, for example, the temperature can be lowered to about 1000° C. The charcoal, acting as a reducing agent, initially produces carbon monoxide which further reacts with the zinc oxide; the process in the dissociation reactor 6, FIG. 4, is then given by $$ZnO + CO \rightarrow Zn + CO_2 \tag{701}$$

$$C + CO_2 \rightarrow 2CO \tag{701'}$$

Figure 5:
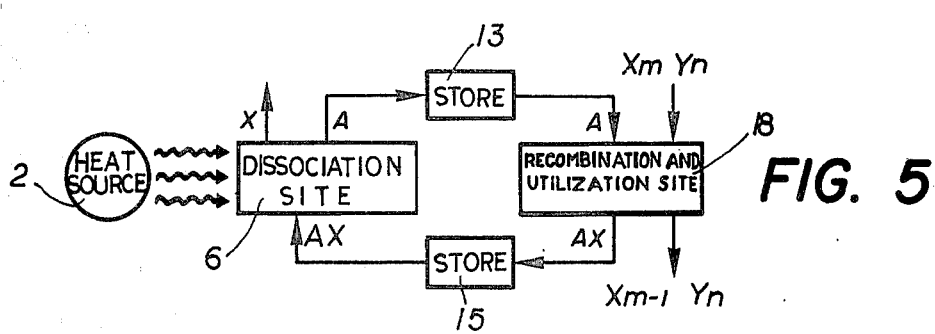

As illustrated in FIG. 5, the recombination site 9 may be merged with the point of utilization 1 in a common enclosure 18 in which the exothermic reaction $A + X \rightarrow AX$ promotes an endothermic reaction $X_m Y_n \rightarrow X_{m-1} Y_n$ where $X_{m-1} Y_n$ is a desired industrial product; the endothermic reaction within enclosure 18 will generally proceed in a temperature range substantially lower—e.g. by about 100° to 200° C.—than the temperature range of the exothermic reaction. The compound $X_m Y_n$ to be decomposed may be a locally abundant substance, such as water. Thus, for example, the processes involved may be $$ZnO \rightarrow Zn + \tfrac{1}{2}O_2 \tag{801}$$

in reactor 6 and $$Zn + H_2O \rightarrow ZnO + H_2 \tag{802}$$

in reactor 18. The thermal decomposition of the zinc oxide at the dissociation site 6 requires a temperature on the order of 2200° K., or more than 1800° C., as indicated above whereas the decomposition of water in the presence of zinc vapor occurs at less than 900° C. Naturally, the aforedescribed expedient of lowering the dissociation temperature of ZnO by the admixture of elemental carbon can be used also in this instance.

Figure 6:
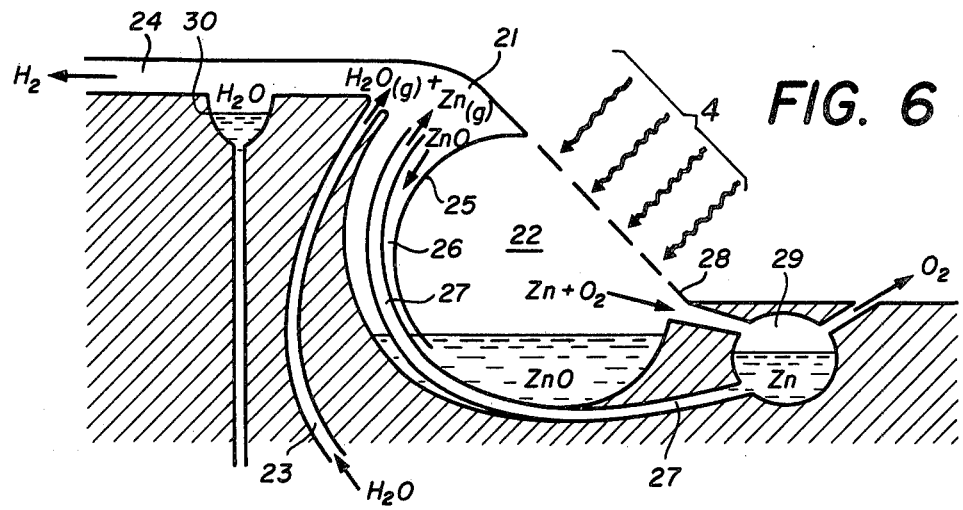
FIG. 6 is a diagrammatic view of an installation used for carrying out our process, shown in vertical section.

FIG. 6 illustrates an apparatus for carrying out the reactions (801) and (802) without the use of a special reducing agent. The apparatus comprises a chamber 21, corresponding to the reactor 18 of FIG. 5, in which water is to be decomposed to release hydrogen which is discharged via an outlet 24 for further utilization. Another chamber 22, corresponding to reactor 6 of FIG. 6, serves for the dissociation of zinc oxide into metallic zinc and oxygen, in the presence of highly concentrated solar radiation 4 entering that chamber through a window 28. In order to produce the necessary operating temperature, the sun's rays may be focused upon a heliostatic reflector which keeps them trained upon the window 28. The zinc vapors and the oxygen pass from chamber 22 into an adjoining separator 29 whence the oxygen escapes into the atmosphere while the zinc, upon cooling to about 900° C. from the dissociation temperature of more than 1800° C., condenses and forms a pool. Compartment 29, therefore, plays the part of a reservoir such as the store 13 shown in FIG. 5.

Some of the liquefied zinc present in compartment 29 enters several parallel conduits 27 (only one shown) which are in heat-exchanging relationship with chamber 22 whereby the zinc in these conduits is revaporized and rises into chamber 21. Water from a nonillustrated source is vaporized, either by waste heat from chamber 22 or by other heating means not shown, as it passes into the same chamber 21 via a channel 23. The steam and the zinc gases interact within that chamber, at a temperature below 900° C., to form pulverent zinc oxide and gaseous hydrogen, the zinc ozide then descending by gravity along a partition 25 between chambers 21 and 22 into an inlet 26 of the latter chamber where it forms a pile exposed to the incoming solar radiation for a repetition of the cycle. The duct 24 includes a water trap 30 designed to condense water vapors entrained by the hydrogen gas leaving the chamber 21. The store 15 of FIG. 5 is here represented by the lower part of chamber 22 containing the mass of zinc oxide whose mean temperature is now well above the boiling point of zinc and which is traversed by the conduits 27.

The system of FIG. 6 may have an ancillary inlet, not shown, for the introduction of zinc or zinc oxide to compensate for losses incurred in operation.

The system of FIG. 5 can also be utilized, for example, to produce a synthesis gas of the general formula $$\alpha CH_4 + \beta CO + \gamma CO_2 + \delta H_2$$

through the decomposition of organic compounds, of the general formula $C_xH_yO_z$, by the cyclic dissociation and recombination of a carbonate. Suitable organic substances include lignite, wood chips, cellulosic matter and the like. Hydrocarbons, preferably saturated ones, may also be used. With calcium carbonate as a starting compound, the following reactions can be established:

$$CaCO_3 \rightarrow CaO + CO_2 \tag{901}$$

$$CaO + CO_2 \rightarrow CaCO_3 \tag{902}$$

$$C_xH_yO_z \rightarrow \alpha CH_4 + \beta CO + \gamma CO_2 + \delta H_2 + \epsilon C \tag{903}$$

$$C + H_2O \rightarrow CO + H_2 \tag{904}$$

$$CO + H_2O \rightarrow CO_2 + H_2 \tag{905}$$

$$C + 2H_2 \rightarrow CH_4 \tag{906}$$

Reaction (901) takes place in chamber 6 whereas the others occur in chamber 18. Among the latter, reaction (902) is the exothermic recombination process, reaction (903) is of pyrolytic nature and endothermic reactions (904)–(906) are a series of gasification steps which convert the free carbon of reaction (903) and a corresponding amount of water into the various constituents of a synthesis gas. With z=0, i.e. in the case of hydrocarbons, the CO and $CO_2$ components of the gas come into existence only in steps (904) and (905).

Figure 7:
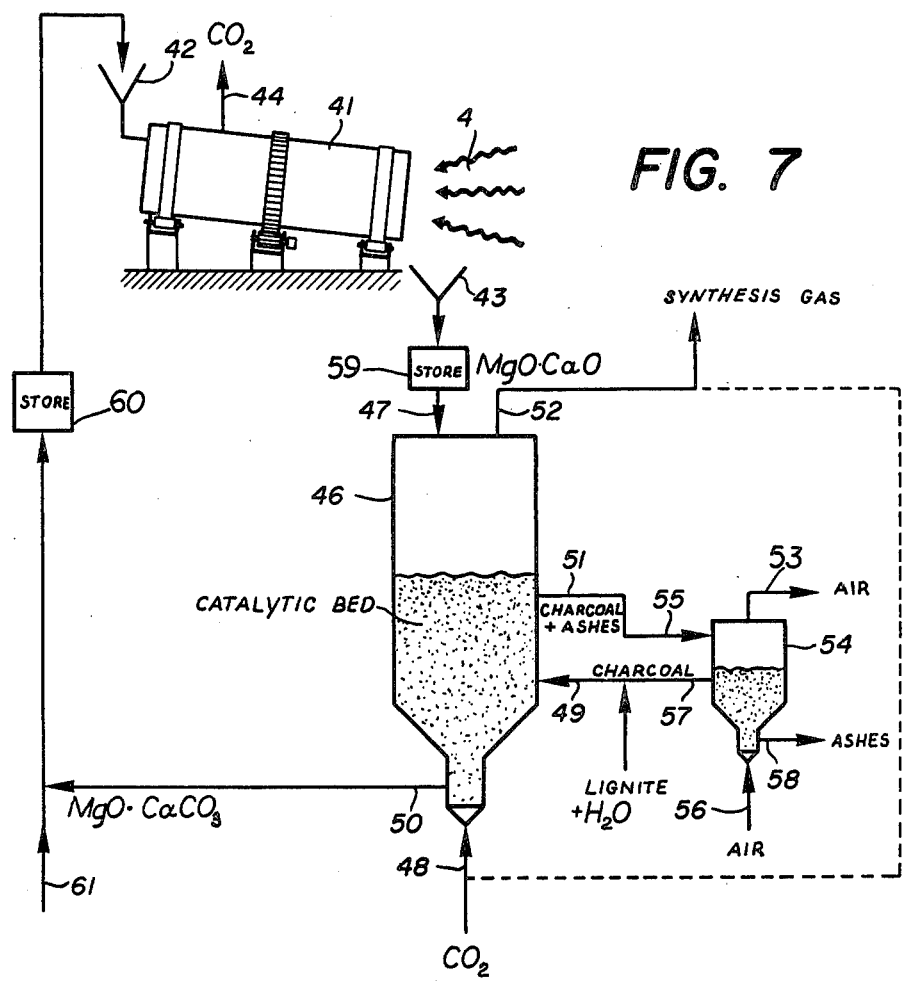
FIG. 7 is a diagrammatic view of another such installation, shown in elevation.

In FIG. 7 we have illustrated a system designed to perform this type of operation. A rotary solar furnace 41, heated to high temperatures by incident radiation 4, has an inlet 42 and two exits 43 and 44. A gasifying reactor 46 of the fluidized-bed type, including a cracking catalyst such as Raney nickel, has inlets 47–49 and outlets 50–52. A fluidized-bed separator 54 has an inlet 55 communicating with reactor outlet 51, an outlet 57 communicating with reactor inlet 49, an air inlet 56, an air outlet 53 and a further outlet 58. A first store 59 is inserted between furnace outlet 43 and reactor inlet 47 whereas a second store 60 lies between reactor outlet 50 and furnace inlet 42. A supplemental inlet 61 merges with outlet 50 at the entrance of store 60.

As here specifically contemplated, the thermally dissociable starting material is a mixture of magnesium oxide and calcium carbonate (derived from dolomite) stored in reservoir 60 and loaded via inlet 42 into solar furnace 41. The presence of magnesium oxide lowers the dissociation temperature of the calcium carbonate in furnace 41 to a level on the order of 900°–1000° C. The endothermic dissociation of $MgO.CaCO_3$ in the solar furnace releases carbon dioxide which escapes into the atmosphere at outlet 44. The reduced mixture $MgO.CaO$ is temporarily stored in reservoir 59 whence it enters, at the requisite rate, the reactor 46 for recombination with $CO_2$ admitted into that reactor through its inlet 48; this gas could, of course, be the same that leaves the furnace 41 at exit 44. Lignite and water vapor are introduced into the reactor by way of its inlet 49.

The reconstitution of the starting material $MgO.CaCO_3$ within reactor 46, at a temperature on the order of 800°–850° C., converts the lignite and water vapor into a raw synthesis gas pursuant to reactions (903)–(906) which is available at outlet 52, leaving a residue of charcoal and ashes exiting from the reactor at 51 and entering the separator 54 at 55. Part of the synthesis gas may be recycled to the reactor inlet 48, as indicated in dotted lines, to lower the partial water-vapor pressure therein. The charcoal is returned from the separator 54 to the reactor 46 via connection 57/49 while the ashes are discharged at outlet 58. The recycling of the charcoal converts the residual carbon into constituents of the synthesis gas, as discussed above with reference to reactions (904)–(906), to insure a maximum yield for a given quantity of raw material (lignite).

In order to replenish the recycled starting material, a natural mixture of magnesium and calcium carbonates (dolomite) can be introduced into the store 60 by way of inlet 61 for subsequent transformation into the dissociation product $MgO.CaO$.

Another way of producing a synthesis gas by the process according to our invention, with a system of the type shown in FIG. 5, involve the endothermic reduction of lithium carbonate $Li_2CO_3$ to lithium oxide $Li_2O$ and subsequent exothermic reaction of the latter with carbon dioxide, the heat liberated on recombination being again utilized to produce a synthesis gas. With the cracking of a synthetic hydrocarbon—specifically a lower alkane such as methane or naphtha for example—within reactor 18, the reactions involved are as follows:

$$Li_2CO_3 \rightarrow Li_2O + CO_2 \tag{1001}$$

$$Li_2O + CO_2 \rightarrow Li_2CO_3 \tag{1002}$$

$$C_nH_{2n+2} + \frac{n-1}{2} H_2O \longrightarrow \frac{3n+1}{4} CH_4 + \frac{n-1}{4} CO_2 \tag{1003}$$

$$CH_4 + H_2O \rightleftharpoons CO + 3H_2 \tag{1004}$$

$$CO + H_2O \rightleftharpoons CO_2 + H_2 \tag{1005}$$

Reaction (1001), taking place in chamber 6, is again endothermic, as is reaction (1004) proceeding from left to right within chamber 18 until terminated by a state of equilibrium; with higher temperatures, the latter reaction shifts further toward the right with generation of more elemental hydrogen. The recombination process (1002) is strongly exothermic while reactions (1003) and (1005) are weakly so. Reactions (1003)–(1005) are again promoted by the presence of a cracking catalyst, such as Raney nickel, on a refractory carrier. The dissociation temperature in reactor 6 is on the order of 1200° C. while the operating temperature within reactor 18 is at a level of approximately 900°–1000° C.

Figure 8:
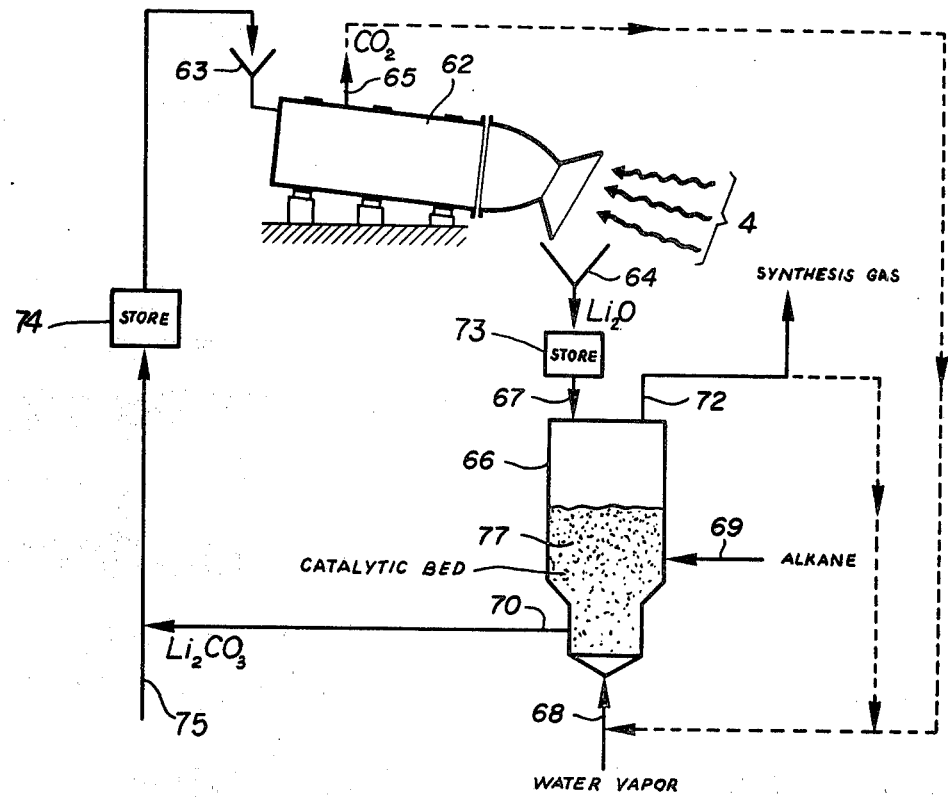
FIG. 8 is a view similar to FIG. 7, illustrating a further modification.

FIG. 8 shows an installation designed to carry out the process just described. A rotary solar furnace 62, again irradiated with solar energy 4 in the aforementioned manner, has an inlet 63 for lithium carbonate and two outlets 64, 65 for the discharge of lithium oxide and carbon dioxide, respectively. Outlet 64 communicates via a store 73 with an inlet 67 of a fluidized-bed reactor 66 provided with two further inlets 68 and 69; the former receives $CO_2$ (possibly from furnace outlet 65, as shown) and water vapor, while the latter serves for the introduction of a light hydrocarbon such as naphtha. The bed 77 of reactor 66 contains a catalytic charge such as nickel-coated ceramic pellets. An outlet 72 serves for the discharge of raw synthesis gas, part of which may be recycled to inlet 68 to lower the partial water-vapor pressure in the reactor, while another outlet 70 delivers the reconstituted lithium carbonate via a store 74 to inlet 63 of furnace 62. An ancillary inlet 75, merging with outlet 70, is again provided for replenishing purposes; instead of introducing supplemental $Li_2CO_3$ into the store 74 through this inlet 75, it would also be possible to load the store 73 with additional $LiO_2$ via an inlet not shown.

The operating temperature in furnace 62, required for the dissociation of $Li_2CO_3$ according to reaction (1001), is about 1200° C. while that in reactor 66 is a few hundreds of degrees lower, as noted above.

Figure 9:
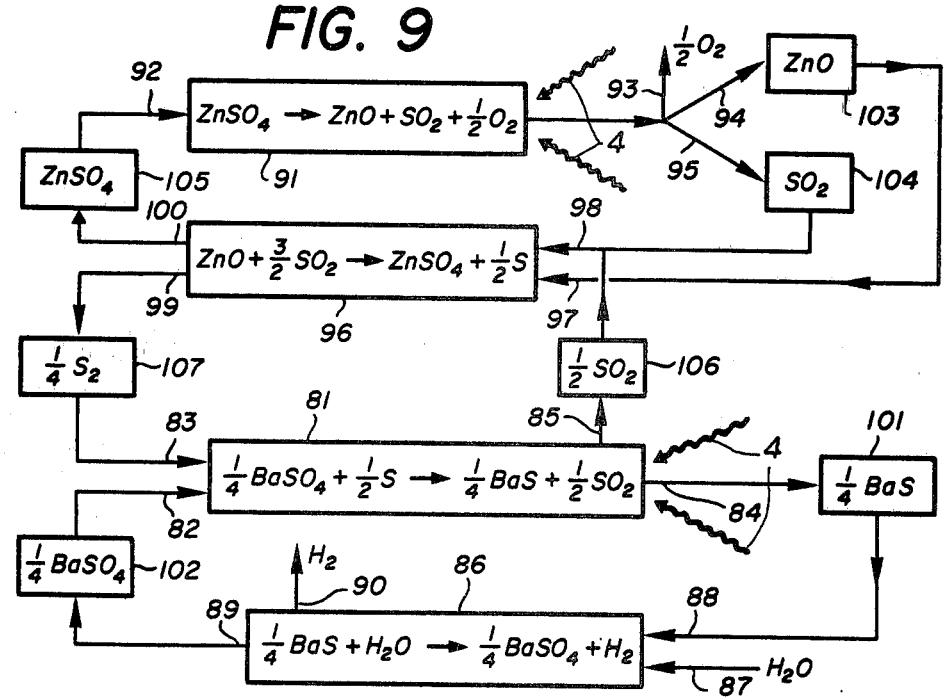
FIG. 9 is a block diagram representing a more complex system.

In FIG. 9 we have schematically illustrated an installation for the production of hydrogen by a process according to our invention which uses a primary and a secondary cycle for the decomposition of water. The primary cycles involves dissociation of barium sulfate in a main reactor 81, with interim storage of the resulting barium sulfide in a reservoir 101 connected to an outlet 84 of that reactor. The stored barium sulfide is fed to an inlet 88 of another reactor 86 receiving water (or steam) via another inlet 87. The interaction of these components in reactor 86 yields hydrogen, removed at an outlet 90, and barium sulfate exiting at another outlet 89 to a reservoir 102 for interim storage prior to introduction into reactor 81 by an inlet 82 thereof. Sulfur dioxide, another product of dissociation, leaves the reactor 81 at an outlet 85 and, after interim storage in a reservoir 106, is supplied to an inlet 98 of a reactor 96 to participate in the secondary cycle in which the starting material is zinc sulfate, dissociated in a reactor 91 to zinc oxide, sulfur dioxide and oxygen. The oxygen is discharged into the atmosphere at an outlet 93 while the other reaction products are delivered by way of respective outlets 94 and 95 to a store 103 of the zinc oxide and a store 104 for the sulfur dioxide; these two compounds are then fed into reactor 96 via inlets 97 and 98, respectively, to reconstitute the original zinc sulfate which leaves the reactor at an outlet 100 and is recycled to reactor 91 via a store 105 and an outlet 92. The reaction in vessel 96 also yields free sulfur which is admitted to reactor 81 through an inlet 83 thereof via a store 107 in order to assist in the reduction of the barium sulfate. The two reactors 81 and 91 are irradiated with solar energy 4 as required for the endothermic processes taking place therein.

More specifically, the reactions involved in this double-cycle process are the following

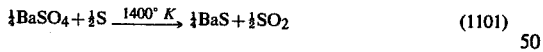  (1101)

in reactor 81;

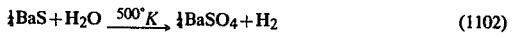  (1102)

in reactor 86;

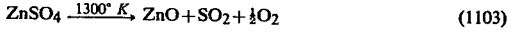  (1103)

in reactor 91; and

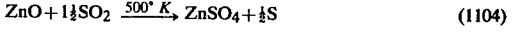  (1104)

in reactor 96.

The temperature indicated in reactions (1101)–(1104) are, of course, only approximate values.

We claim:

1. A process for the recovery of a constituent present in oxidized form in a compound which is available at a reaction site and is endothermally reducible in a predetermined temperature range, comprising the steps of:
   (a) endothermally reducing at another location an oxidized reactant with the aid of thermal energy from a source not readily available at the reaction site, the reduction of said reactant proceeding in an elevated temperature range higher than said predetermined range, with release of the liberated oxygen;
   (b) transferring the reduced reactant from said location to said reaction site;
   (c) interacting said reactant at said reaction site with said compound for exothermally reoxidizing said reactant, the heat generated by the exothermic reaction being at least partly utilized to reduce said constituent;
   (d) retransferring the reoxidized reactant to said location; and
   (e) repeating steps (a) through (d).

2. A process as defined in claim 1 wherein the thermal energy used in step (a) is solar heat.

3. A process as defined in claim 1 wherein said compound is water.

4. A process as defined in claim 1 wherein said oxidized reactant is admixed in step (a) with an additive lowering its dissociation temperature.

5. A process as defined in claim 1, comprising the further steps of temporarily storing a quantity of said reduced reactant between steps (a) and (b) and temporarily storing a quantity of the reoxidized reactant between steps (c) and (d).

6. A process as defined in claim 1 wherein said oxidized reactant is an oxide of a metal reduced to a lower state of oxidation in step (a).

7. A process as defined in claim 6 wherein said metal is, zinc.

8. A process for the recovery of a constituent present in oxidized form in an endothermally reducible compound available at a reaction site, comprising the steps of:
   (a) endothermally converting a metal sulfate in the presence of elemental sulfur at another location, with the aid of thermal energy from a source not readily available at the reaction site, into a metal sulfide with release of sulfur dioxide;
   (b) transferring said metal sulfide from said location to said reaction site;
   (c) interacting said metal sulfide at said reaction site with said compound for reducing said constituent thereof while oxidizing said metal sulfide to reconstitute said metal sulfate;
   (d) retransferring the reconstituted metal sulfate to said location; and
   (e) repeating steps (a) through (d).

9. A process as defined in claim 8 wherein said metal sulfate is barium sulfate.

10. A process as defined in claim 9 wherein said endothermally reducible locally compound is water.

11. A process as defined in claim 9 wherein the sulfur dioxide released in step (c) is reduced to elemental sulfur in a secondary cycle, the sulfur being returned to the reaction site for assisting in the reduction of the barium sulfate in step (a).

12. A process as defined in claim 11 wherein said secondary cycle includes an endothermic dissociation of zinc sulfate and an exothermic recombination of resulting zinc sulfide and sulfur dioxide to zinc sulfate with release of said elemental sulfur.

13. A process as defined in claim 8 wherein the thermal energy used in step (a) is solar heat.

14. A process for producing a synthesis gas, comprising the steps of:
   (a) endothermally dissociating at a first location a metal carbonate, with the aid of thermal energy from an external source, into a metal oxide and carbon dioxide;
   (b) transferring said metal oxide to a second location;
   (c) exothermally recombining said metal oxide at said location with carbon dioxide to reconstitute said metal carbonate;
   (d) endothermally decomposing an organic substance in contact with said metal oxide at said second location, with the heat generated by the reaction of step (c), into several constituents including methane, hydrogen and carbon monoxide;
   (e) retransferring the reconstituted metal carbonate to said first location; and
   (f) repeating steps (a) through (e).

15. A process as defined in claim 14 wherein said metal carbonate is $Li_2CO_3$, said organic substance being a light hydrocarbon.

16. A process as defined in claim 14 wherein said metal carbonate is $Li_2CO_3$, said organic substance being a cellulose derivative.

17. A process as defined in claim 14 wherein said second location is the interior of a reactor containing a cracking catalyst for promoting the reaction of step (c).

18. A process as defined in claim 16 wherein said cracking catalyst is nickel.

19. A process as defined in claim 14 wherein said external source is the sun.

20. A process as defined in claim 14 wherein said metal carbonate is selected from the group which consists of $CaCO_3$ and $Li_2CO_3$.

* * * * *